US009529522B1

(12) United States Patent
Barros et al.

(10) Patent No.: US 9,529,522 B1
(45) Date of Patent: Dec. 27, 2016

(54) GESTURE-BASED SEARCH INTERFACE

(71) Applicant: Expect Labs, Inc., San Francisco, CA (US)

(72) Inventors: Brett Barros, San Francisco, CA (US); Moninder Jheeta, Redmond, WA (US); George Samuel Kola, Concord, CA (US); Timothy Tuttle, San Francisco, CA (US)

(73) Assignee: Mindmeld, Inc., San Francisco, CA (US)

( * ) Notice: Subject to any disclaimer, the term of this patent is extended or adjusted under 35 U.S.C. 154(b) by 194 days.

(21) Appl. No.: 13/973,924

(22) Filed: Aug. 22, 2013

Related U.S. Application Data

(60) Provisional application No. 61/698,339, filed on Sep. 7, 2012.

(51) Int. Cl.
*G06F 3/0482* (2013.01)
*G06F 3/0488* (2013.01)
*G06F 17/30* (2006.01)

(52) U.S. Cl.
CPC ........... *G06F 3/0488* (2013.01); *G06F 3/0482* (2013.01); *G06F 17/30864* (2013.01)

(58) Field of Classification Search
CPC . G06F 3/0482; G06F 17/30864; G06F 3/0488
See application file for complete search history.

(56) References Cited

U.S. PATENT DOCUMENTS

2007/0255742 A1* 11/2007 Perez ................ G06F 17/30713
2008/0235018 A1* 9/2008 Eggen ..................... G10L 15/26 704/251
2009/0288044 A1* 11/2009 Matthews ............ G06F 3/0482 715/863
2009/0306981 A1* 12/2009 Cromack .......... G06F 17/30743 704/235
2009/0319516 A1* 12/2009 Igelman ................. G06Q 30/02
2012/0110052 A1* 5/2012 Smarr et al. .................. 709/201
2012/0167010 A1* 6/2012 Campbell ......... G06F 17/30693 715/825
2013/0041893 A1* 2/2013 Strike ................ G06F 17/3089 707/723
2013/0144603 A1* 6/2013 Lord .................. H04L 12/1831 704/9

(Continued)

*Primary Examiner* — William Bashore
*Assistant Examiner* — Daniel Parcher
(74) *Attorney, Agent, or Firm* — Fenwick & West LLP

(57) ABSTRACT

A gesture-based search interface is provided on a client device. A concept interface is displayed within the search interface, the concept interface including a plurality of selected concept tabs. A content interface is also displayed within the search interface, the content interface configured to, in response to a selection of a concept tab, display content associated with a concept represented by the selected concept tab. A gesture input is received at the client device, for instance a touch input received at a touch-screen of the client device. A concept input mechanism is presented in response to the gesture input, and an additional concept tab is presented within the concept interface in response to receiving a concept via the concept input mechanism. The content interface displays content associated with the received concept when the additional concept tab is selected.

15 Claims, 9 Drawing Sheets

550

555 554 501 551 556 552 505c 553 505d

(56) References Cited

U.S. PATENT DOCUMENTS

2013/0179502 A1* 7/2013 Faller .................... H04L 65/403
709/204
2013/0232148 A1* 9/2013 MacDonald et al. ......... 707/740
2014/0006550 A1* 1/2014 Cain .................. G06K 9/00892
709/217

* cited by examiner

GESTURE-BASED SEARCH INTERFACE

CROSS REFERENCE TO RELATED APPLICATIONS

The application claims the benefit of Provisional Application No. 61/698,339, filed on Sep. 7, 2012, the content of which is incorporated herein by reference.

BACKGROUND

Field of Disclosure

This disclosure relates to the fields of real-time voice and video communication and anticipatory computing.

Description of the Related Art

As mobile devices such as smart phones and tablets grow in popularity, the demand for smarter and more efficient communications and collaboration tools is also growing. While email, telephone, and video conferencing software are popular tools for collaboration, these tools do not leverage the computing power of client devices and cloud services to enhance the collaborative process. For example, while text-based search services are commonplace today, typing queries on mobile devices during a collaborative session is often inconvenient and impractical. Voice-based interfaces to search engines are similarly unhelpful since capturing specific search instructions from users during a voice call or video call may be disruptive to the flow of a conversation. For instance, a user may speak into their phone during a conference call to explicitly ask a search engine for information related to some relevant topic. However, such a voice-input scheme is not sufficient for many users since interrupting the conference call is disruptive and explicitly specifying all the appropriate search terms verbally to retrieve relevant search results may be excessively cumbersome and time-consuming when the desired results are based on many different, context-specific terms.

SUMMARY

The above and other issues are addressed by a method, non-transitory computer readable storage medium, and computer system for enabling gesture-based search. An embodiment of the method comprises providing a search interface on a client device. A concept interface is displayed within the search interface, the concept interface including a plurality of selected concept tabs. A content interface is also displayed within the search interface, the content interface configured to, in response to a selection of a concept tab, display content associated with a concept represented by the selected concept tab. A gesture input is received at the client device, for instance a touch input received at a touch-screen of the client device. A concept input mechanism is presented in response to the gesture input, and an additional concept tab is presented within the concept interface in response to receiving a concept via the concept input mechanism. The content interface displays content associated with the received concept when the additional concept tab is selected.

An embodiment of the medium stores executable computer program instructions for enabling gesture-based search. The instructions, when executed, cause a client device to provide a search interface. A concept interface is displayed within the search interface, the concept interface including a plurality of selected concept tabs. A content interface is also displayed within the search interface, the content interface configured to, in response to a selection of a concept tab, display content associated with a concept represented by the selected concept tab. A gesture input is received at the client device, for instance a touch input received at a touch-screen of the client device. A concept input mechanism is presented in response to the gesture input, and an additional concept tab is presented within the concept interface in response to receiving a concept via the concept input mechanism. The content interface displays content associated with the received concept when the additional concept tab is selected.

An embodiment of the computer system for enabling gesture-based search includes a non-transitory computer-readable storage medium storing executable computer program instructions. The instructions, when executed, cause the computer system to provide a search interface. A concept interface is displayed within the search interface, the concept interface including a plurality of selected concept tabs. A content interface is also displayed within the search interface, the content interface configured to, in response to a selection of a concept tab, display content associated with a concept represented by the selected concept tab. A gesture input is received at the computer system, for instance a touch input received at a touch-screen of the computer system. A concept input mechanism is presented in response to the gesture input, and an additional concept tab is presented within the concept interface in response to receiving a concept via the concept input mechanism. The content interface displays content associated with the received concept when the additional concept tab is selected. The computer system also includes a processor for executing the computer program instructions.

BRIEF DESCRIPTION OF DRAWINGS

FIGS. 6A, 6B, and 6C illustrate additional embodiments of interfaces of the collaborative communication application.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
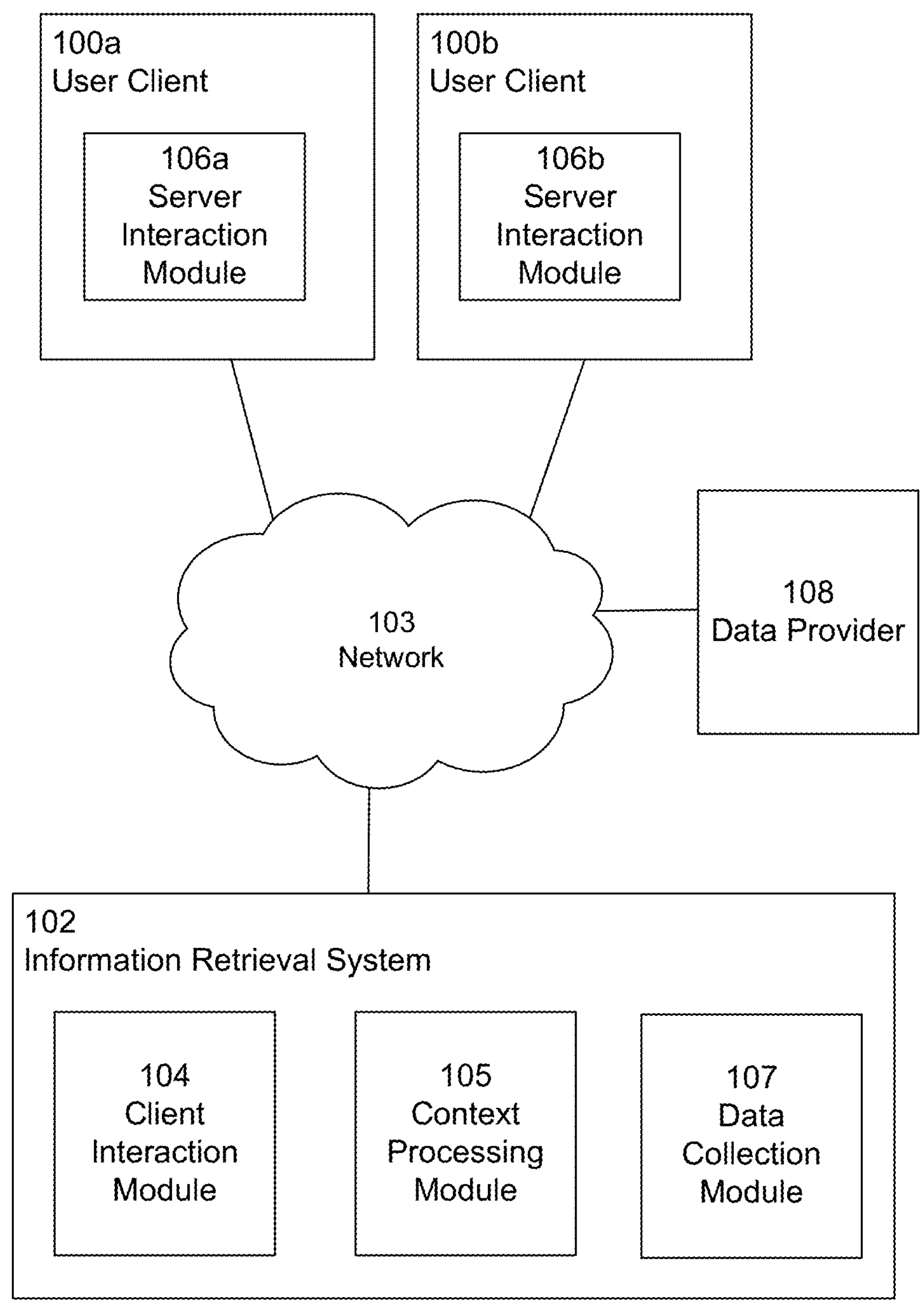
FIG. 1 is a high-level block diagram illustrating an embodiment of an information retrieval system connected by a network to a user client.

FIG. 1 is a high-level block diagram illustrating an embodiment of an information retrieval system 102 connected by a network 103 to one or more user clients (such as user client 100*a* or 100*b*, hereinafter "user clients 100"

collectively and "user client 100" individually) and data providers 108. Each user client 100 includes a server interaction module (such as server interaction module 106*a* or 106*b*, hereinafter "server interaction modules 106" collectively and "server interaction module 106" individually). While only two user clients 100, and a single data provider 108 are shown in FIG. 1, embodiments can have many of such entities. In addition, embodiments can have multiple information retrieval systems 102.

The user clients 100 are computing devices used by users to perform various functions. A user client 100 might be, for example, a personal computer, a personal digital assistant, a smart phone, a laptop computer, a tablet computer, or any other type of network-capable device such as a networked television or set-top box. In this embodiment a user operates the user client 100 to perform tasks such as using applications, consuming media, browsing the Internet, shopping, navigating, text messaging, voice calling, video calling, conference calling, using social networks, etc. The user clients 100 may also be used by users to issue requests for information from the information retrieval system 102, and to display the information returned from the information retrieval system 102.

The users operating the user clients 100 interact with the information retrieval system 102 using the server interaction module 106. In various embodiments the server interaction module 106 may be an application such as a search application or communication application, an operating system component of the user client 100, or a web application executing in a browser. In one embodiment the server interaction module 106 is a collaborative communication application with anticipatory computing capabilities, described in more detail herein. The users may send requests to the information retrieval system 102 explicitly, for example in the form of a search query typed into the server interaction module 106, or the server interaction module 106 may send requests implicitly, based on the current context of the users. The requests may be sent automatically, continuously, or periodically.

The server interaction module 106 also receives and displays contextually-relevant information received from the information retrieval system 102. This information may be received and displayed in response to an explicit request from a user. In addition, the server interaction module 106 may automatically receive and display information relevant to a user pushed from the information retrieval system 102 without an explicit request from the user. The user may interact with the contextually-relevant information.

The server interaction module 106 also collects data related to users and their activities from the user clients 100, and sends this context information to the information retrieval system 102. This information may be sent to the information retrieval system 102 continuously as users perform activities such as communicating with other users, entering data, browsing the web, changing locations, etc. The context information may include structured data that is generated by the server interaction module 106 from activity data collected from the user clients 100. For example, speech-to-text technology may be used by the server interaction module 106 to convert voice data, captured from the user client 100, to text data. The text data may be further annotated by the server interaction module 106 to indicate a speaker or source in the structured data. Similarly, face recognition, object recognition, and gesture recognition may be performed by the server interaction module 106 to generate structured data from images and video. This structured data may indicate the identities of people, objects, and gestures in image and video data. In the case where a user is communicating with one or more other users, such as through a phone call, video chat, text chat, email, etc., the server interaction module 106 may generate structured data related to the communication indicating the identities of the users participating in the communication. The structured data of various types may be sent to the information retrieval system 102 instead of, or in addition to, the raw activity data (e.g., raw voice, image, and video data) captured from the user clients 100.

The context information—including the structured data—collectively establishes a context for a user. A user's context is a description of the concept, topics, ideas, etc., that may be currently relevant to a user. The context is based on information about the user, including information about the user's current and past activities. The context for a user may also be based on information about users that are in communication with that user.

The server interaction module 106 may allow users to log into the information retrieval system 102 using login credentials such as a user name and password to establish a persistent identity with the information retrieval system 102. In addition, the users may use the server interaction module 106 to set preferences with respect to privacy and other aspects of interactions with the information retrieval system. For example, a user may set preferences restricting the types of context information that are sent to the information retrieval system 102.

The data providers 108 are information providers that provide data about users to the information retrieval system 102. The data providers 108 provide user information such as, for example, purchases recently made by a user, products reviewed by a user, demographic data about a user such as age, income range, geographical location, social data about a user such as information describing the user's social graph (e.g., friends, connections, co-workers), media preferences of the user, etc. The data providers 108 may be third-party services such as social networks, retailers, telephone companies, etc. that may collect information related to users as part of their own operations. The data providers 108 may provide the collected information to the information retrieval system 102 continuously as it is generated. The information provided by the data providers 108 for a user is also considered a part of the context information for that user.

The network 103 provides a communication infrastructure between the user clients 100, the information retrieval system 102, and the data providers 108. The network 103 is typically the Internet, but may be any network, including but not limited to a Local Area Network (LAN), a Metropolitan Area Network (MAN), a Wide Area Network (WAN), a mobile wired or wireless network, a private network, or a virtual private network.

The information retrieval system 102 receives context information and requests for information from the server interaction modules 106 executing on the user clients 100 and sends information that is relevant to the requests and/or context back to the user clients 100. The information retrieval system 102 comprises a client interaction module 104, a context processing module 105, and a data collection module 107.

The client interaction module 104 interacts with the user clients 100. To this end, the client interaction module 104 receives requests for information and context information from the server interaction modules 106 executing on the user clients 100. In addition, the client interaction module 104 provides contextually-relevant information to the user clients 100. The client interaction module 104 may also perform other tasks, such as allowing users operating the user clients 100 to log into the information retrieval system 102 by receiving and verifying login credentials from the server interaction module 106.

The context information received from the user clients 100 includes data such as voice data, video data, text data, social data, location data, web browsing data, application usage data, etc. The context information received from a user client 100 is typically used to establish a context for the user operating that user client 100. In some instances a single user may operate more than one user client 100. In this case the context information received from each user client 100 operated by the user may be used to establish a single context for the user operating multiple user clients 100. The client interaction module 104 may establish that the user using each of the multiple clients is the same user by requiring the user to log into the system on each client. In the instance when the user is in communication with one or more other users, each using their own user clients, the context for the user may be established using additional context information received from the other user clients 100 that are in communication with the user client 100 operated by the user. The client interaction module 104 may determine the identities of the other user clients 100 from which it may receive content information based on the structured data received from the user's user client 100. For example, take the case of a user X operating a smart phone who initiates a voice conference call with two other users Y and Z, operating their own smart phones. The server interaction module 106 operating on X's smart phone will send structured data to the client interaction module 104 of the information retrieval system 102 containing context information about the conference call. This context information may include not only speech-to-text data based on what X says over the smart phone, but also information about the identities of the users Y and Z and/or the identities of their smart phones. This information may be used to determine the context information received from the smart phones of Y and Z, so that this context information can be used to help establish X's context (in addition to the contexts for Y and Z if needed).

The data collection module 107 receives context information about users from the data providers 108. This information is also sent to the context processing module 105.

The context processing module 105 receives the context information from the client interaction 104 and the data collection 107 modules and generates a representation of the current context for a user based on this information; the representation of the context in turn may be used to generate a context-relevant result set for that user. The context-relevant result set for a user is a set of content that is predicted to be relevant to that user based on the context information associated with that user. The context-relevant result set may be updated as new context information is received from the user clients 100 and the data providers 108. The context processing module 105 is described in greater detail herein.

The context-relevant result set may be sent to the user client 100 where it may be presented to the user through the server interaction module 106. The context-relevant result set may be sent periodically to the user client 100 as it is updated, without explicit instruction from the user. Thus the information retrieval system 102 enables a user to access a relevant set of information at any time, without requiring the user to perform explicit information queries.

Figure 2:
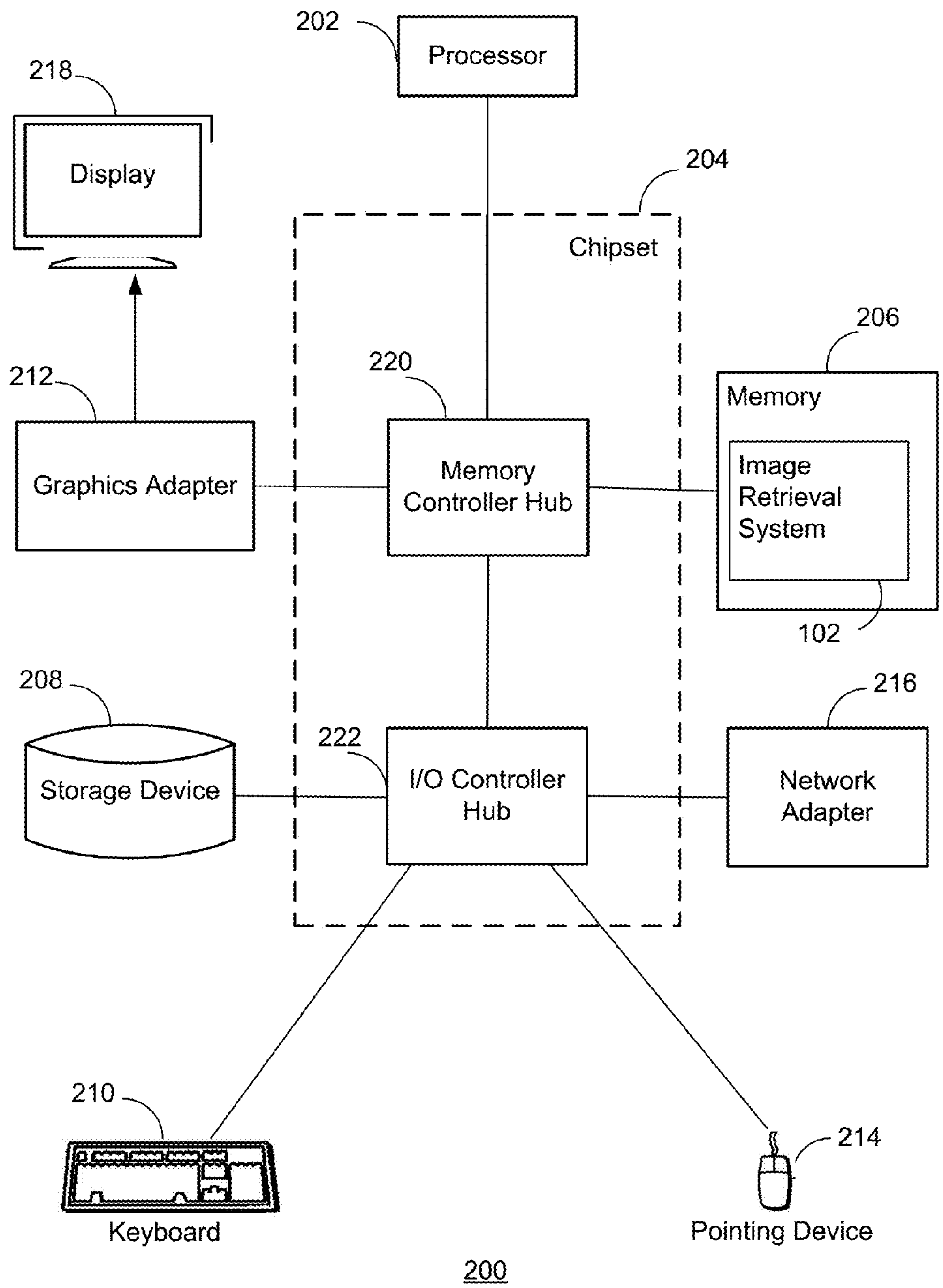
FIG. 2 is a high-level block diagram illustrating an example computer.

FIG. 2 is a high-level block diagram illustrating an example computer 200 for use as one or more of the entities shown in FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the information retrieval system 102 might comprise multiple blade servers working together to provide the functionality described herein. The computers 200 can lack some of the components described above, such as keyboards 210, graphics adapters 212, and displays 218. In addition, the information retrieval system 102 can run in a single computer 200 or multiple computers 200 communicating with each other through a network such as in a server farm.

Figure 3:
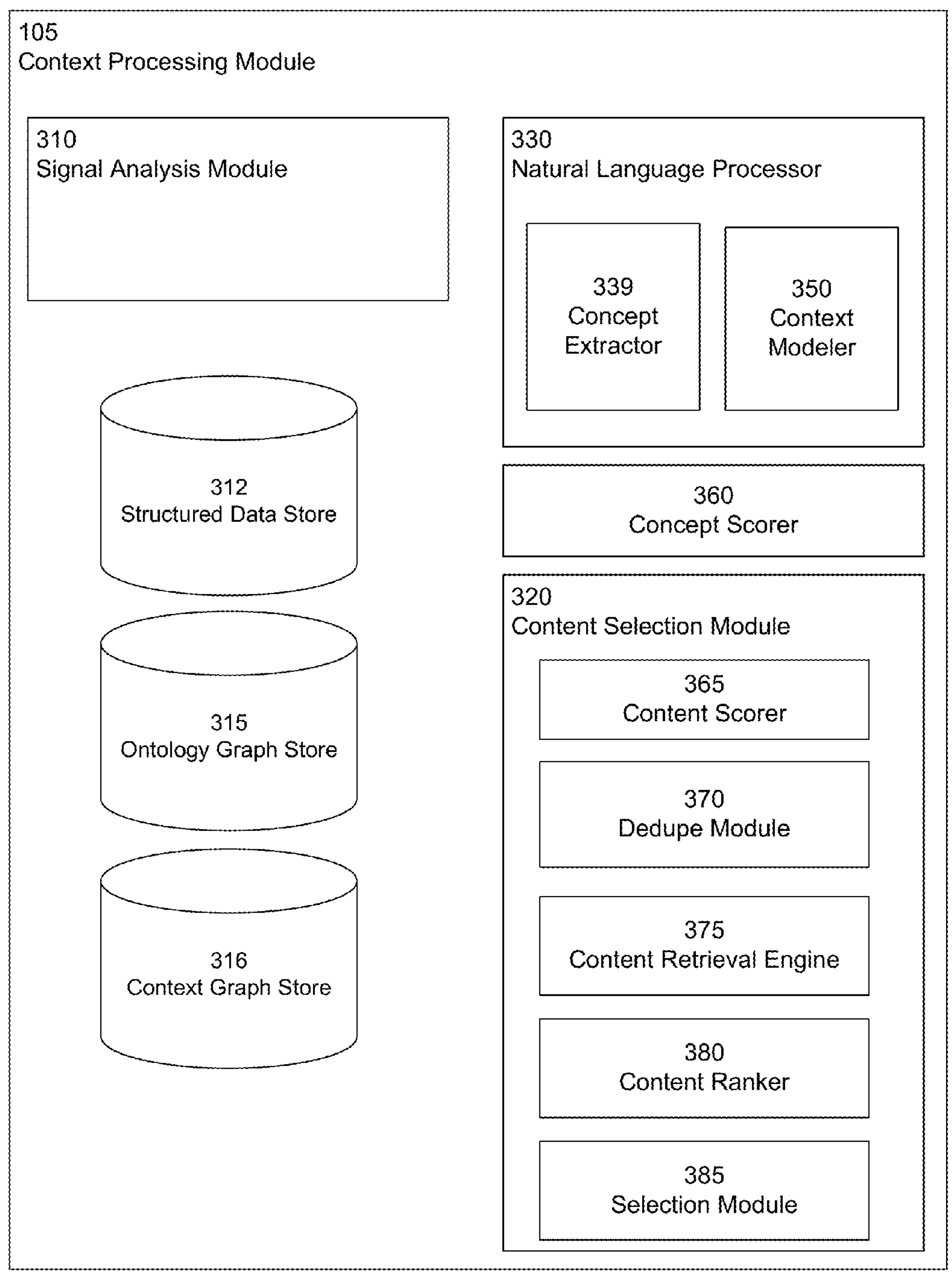
FIG. 3 is a high-level block diagram illustrating a detailed view of modules within the context processing module according to one embodiment.

FIG. 3 is a high-level block diagram illustrating a detailed view of modules within the context processing module 105 according to one embodiment. Some embodiments of the context processing module 105 have different modules than those described here. Similarly, the functions can be distributed among the modules in a different manner than is described here. The context processing module 105 is comprised of a signal analysis module 310, structured data store 312, ontology graph store 315, context graph store 316, content selection module 320, natural language processor 330, and concept scorer 360. The functions of each of these components and their sub-components are described in more detail herein.

The signal analysis module 310 receives context information that has been collected by the client interaction module 104 from user clients 100 and by the data collection module 107 from data providers 108. The context information comprises data on users and their activities. The context information is received continuously and provides real-time information that reflects the current context of users. The signal analysis module 310 may transform the context information into structured data that is standardized and arranged in a form that can be processed by other modules of the system. The signal analysis module 310 may generate structured data from voice, image, and video data using similar techniques as the client interaction module, i.e. speech-to-text, object recognition, voice recognition, face recognition, gesture recognition, etc. In addition, the signal analysis module 310 may also use location analysis, social data analysis, sentiment analysis, and any other data processing that are applicable to the received context information. The signal analysis module 310 may perform analysis to annotate the context information received from the user clients 100 with additional data indicating source, time, and sequence data that may pertain to this context information. For example, context information for a user may be received from not only the user client 100 associated with that user, but also user clients 100 in communication with that user in a conference call or other group communication activity. The context information received from all of these user clients 100 (e.g. voice data that has been converted to text) may be labeled with a source, time, and location to indicate the person, time, and place of each voice contributing to the conversation. This information may also be represented in the structured data as a conversation timeline, with each text representation of a message arranged sequentially by time, and labeled by source and location.

The signal analysis module 310 stores the structure data as data objects in the structured data store 312. The structured data objects may be stored in a standardized format such as XML, JSON, etc., or another format.

The ontology graph store 315 stores an ontology graph describing relationships among concepts. For any given concept, the ontology graph can provide information allowing the system 102 to determine what other concepts are related to it. In one embodiment, the ontology graph is a pre-defined graph structure that contains information describing relationships among many different concepts. In this graph structure concepts are represented as nodes, while relationships between concepts are represented by edges.

For example, the ontology graph may contain information indicating that dogs and cats are types of mammals, and that dogs chase cats. This information might be represented in the ontology graph as a series of connected nodes, where there are three nodes, one for mammals, one for dogs, and one for cats. In this example the dogs node and the cats node would both be connected to the mammals node with edges of type "are a kind of", indicating that dogs and cats are a kind of mammal; and the dogs node would be connected to the cats node with an edge of type "chases", indicating that dogs chase cats. The concepts related to any concept in the ontology graph can thus be discovered by starting at any node and traversing the edges connected to that node. In the example above, if given the concept of dogs, one can quickly discover by traversing edges in the ontology graph that dogs "chase" cats, and that dogs "are a kind of" mammal. The relationships between concepts in the ontology graph 315 are relatively static but may change over time as new concepts and relationships are added and existing concepts/relationships are revised. The information in the ontology graph 315 may be constructed manually or it may be developed over time by automated analysis of large corpuses of language data. In one embodiment, the ontology graph 315 is provided by a third party.

The natural language processor 330 uses the structured data in the structured data store 312 and the ontology graph in the ontology graph store 315 to generate context graphs for users operating user clients 102 connected to the information retrieval system 102. A context graph is a representation of the current context of a user. The context graph may represent the context as a plurality of concepts that are currently relevant to that user.

In one embodiment, the context graph comprises a plurality of concept nodes connected in a graph, where each concept node represents a single concept that is currently relevant to the user. The connections between the concept nodes are weighted edges that reflect the relationship and relevance of concepts to each other. Each concept node may contain information such as one or more sources and times (or timestamps), a type, and a concept score. The source and time for a concept node tell when and how a concept appears in the current context (for example, when and by whom a concept was mentioned in a conference call). Each source that mentions a concept, and each time the concept appears, may be recorded in the concept node. The type describes the kind of concept that the concept node represents (e.g. is the concept a person, place, abstract idea, etc.). The score for a concept node comprises a measure of a concept's importance in the current context. In some implementations the concept node may also include a location, which indicates a geographical location for a real world object associated with the concept. For example, if the concept node is for a town, the location may store the latitude and longitude information for that town.

The generated context graphs are stored in the context graph store 316. Each context graph is associated with a user, and represents that user's current context. In one embodiment, the context graphs are continuously updated, as new context information is received, to reflect concepts that are currently relevant in a user's context.

In one embodiment, the natural language processor 330 comprises a concept extractor 339 and a context modeler 350. The concept extractor 339 extract concepts that are relevant to the current context along with their corresponding sources, times, etc. from the structured data in the structured data store 312 to create concept nodes for a context graph. To this end, the concept extractor 339 may use analysis techniques such as part-of-speech analysis, named-entity extraction, key-phrase detection, concept/category extraction, sentiment analysis, syntax analysis, grammar analysis, semantic analysis, etc.

The context modeler 350 determines the connections to make between the concept nodes generated by the concept extractor 339. The context modeler 350 forms connections between concept nodes when the concepts that these nodes represent are related. The context modeler 350 determines the relationships between concepts using the information in the ontology graph store 315. To discover the relationships between the concepts the context modeler 350 may traverse the ontology graph stored in the ontology graph store 315 to determine the concepts that are connected to each other through edges in the ontology graph. When two concepts are found that are connected by edges in the ontology graph, the corresponding concept nodes in the context graph may be connected by the context modeler 350.

The concept scorer 360 generates a concept score for each concept node in a context graph. The concept score of a concept node reflects the current importance of the corresponding concept to a user. The score for a concept node may be computed in different ways and may reflect factors such as frequency of appearance of the concept it represents in messages from and to the user, time since last mention of the concept in conversation or activities of the user, geographical proximity of the concept (if it is a person or place) to a user, number of sources that have mentioned the concept in a conversation, etc. The score for a concept may also take into account the score and importance of concept nodes that are connected to it in the context graph. For example, the score of a concept node may be a function of its source, how recent the time associated with it is (the time the concept was mentioned), its type, and the scores of the concept nodes connected directly to it. In this way the computation of scores for the concept nodes may be an iterative process where preliminary scores are computed first and then updated scores are recomputed based on the preliminary scores of connected concept nodes.

The content selection module 320 uses the information in the context graphs stored in the context graph store 316 to determine a context-relevant result set for each user requesting information from the information retrieval system 102. The content selection module 320 comprises a content scorer 365, a dedupe module 370, a content retrieval engine 375, a content ranker 380, and a selection module 385 in one embodiment. These modules operate to determine a context-relevant result set.

The content retrieval engine 375 determines a set of content candidates for a user by retrieving content that is relevant to the concepts stored in the concept nodes of the context graph for that user. The content candidates may be any relevant content such as web pages, documents, video, audio, text, location information, retail information, directory information, etc. The content retrieval engine 375 retrieves content that is relevant to the concepts in a context graph by searching for content that is responsive to each concept in the graph. The content retrieval engine 375 may use one or more commercially-available search engines for this task.

The number of content candidates retrieved based on the context graph may be large, since the content retrieval engine 375 retrieves content candidates based on the concepts in the concept nodes, but does not otherwise filter the content. "Retrieval" in this context does not usually mean downloading an entire content candidate, but may mean only determining a location (such as URL) for a content candidate. For example, if the content retrieval engine 375 determines a set of videos that are relevant to the concepts in a context graph, it may place the locations for these videos in the content candidate set, instead of the data for the videos themselves.

The dedupe module 370 filters the content candidate set to remove instances of duplicate content candidates (i.e., performing "deduplication"). Since the content candidates are retrieved using the concepts in the context graph, and since at least some of those concepts may be related to each other, some of the retrieved content may be duplicates of other retrieved content. Duplicate candidates may be detected by comparing the URLs of candidates, by comparing content hashes, or by using any other deduplication techniques. The output of the dedupe module 370 is a filtered content candidate set from which duplicate content candidates have been removed.

The content scorer 365 generates a content score for each content candidate in the filtered content candidate set. A content score reflects an aggregate measure of the relevance of a content candidate to each concept in a context graph, scaled by that concept's concept score. The content score for a content candidate may be generated using different techniques. In one embodiment the content score is generated as the sum of an Okapi BM25 measure of the content candidate for each concept scaled (multiplied) by that concept's concept score. The Okapi BM25 measure is a ranking function that ranks a set of documents using the query terms appearing in the documents. Other ranking functions may be used in other embodiments. Representing this example as a formula, the content score is computed as:

$$\text{Content}_{score} = \sum_{Concepts} \text{Concept}_{score} * BM25(\text{Concept}, \text{Content})$$

The content ranker 380 ranks the content candidates, which have been deduplicated, based on their content scores. Since the content candidates have been scored based on their relevance to the user's current context, the highest ranking content candidates are expected to be the most relevant content that has been found for the user's current context. The lowest ranking content candidates are expected to be the content that is least relevant to the user's current context.

The selection module 385 selects a context-relevant result set for a user based on the ranked content candidate set. In one embodiment, the selection module 385 selects the highest-ranked content candidates for inclusion in the context-relevant result set. The number of content candidates that are selected for the result set may depend on the requirements of the server interaction module 106 executing on the user client 100, on the bandwidth and quality of the user client's network connection, on the capabilities of the user client 100, or on other factors. For example, if the user client is a small device such as a smart phone, the result set may be limited to five or ten content candidates, since more content may be difficult to present to the user on a small screen. Similarly, if the user client 100 has a poor network connection, the result set may be limited to four or five content candidates to ensure that the results can be downloaded in a reasonable amount of time. Design considerations may also play a part in deciding how many content candidates to include in the result set. The server interaction module 106 may be part of a communications application where presenting dozens of content candidates is practical, and so in that case the result set may contain many dozens of content candidates. In some embodiments, the selection module 385 does not necessarily select the top-ranked content candidates for the context-relevant result set, since the top ranked candidates may sometimes be of a uniform type, which would lead to a homogenous and monotonous result set. Users typically prefer a diverse set of information types, so the selection module 385 may select content of different types for the results set. For example, if the top ten ranked content candidates are all images, the selection module 385 may select only the top four or five image content candidates, and then may preferentially select other content candidates from lower in the ranking that are of other types (such as text, video, etc.).

The context-relevant results set is updated by the context processing module 105 as context information is received from the user clients 100 and the data providers 108. When updated context information is received it may cause the context graph to be updated, which in turn may cause the concept scores or concept nodes to be updated, added or removed. In turn content candidates may be added, removed, or re-scored. Any of these actions can generate a different result set that reflects the updated current context of the user or group. As mentioned above, the context-relevant results set may be sent to the user clients 100 by the client interaction module 104, in response to information requests from those clients, or the results set may be pushed periodically to the user clients 100 by the client interaction module 104 according to some automated process or schedule. In one embodiment the result set is sent to the user client 100 whenever the result set is updated.

Figure 4:
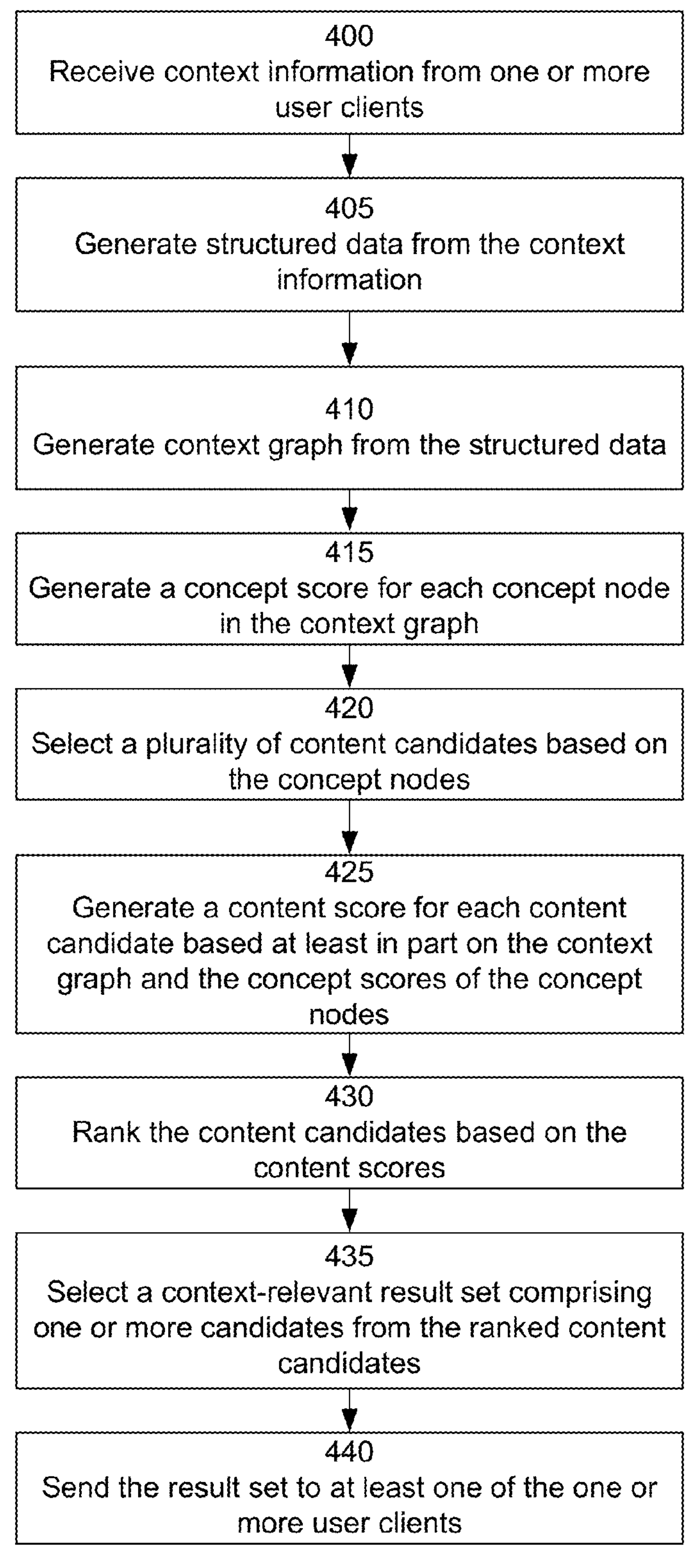
FIG. 4 is a flow chart illustrating a process for generating a context-relevant results set according to one embodiment.

FIG. 4 is a flow chart illustrating a process for generating a context-relevant results set according to one embodiment.

Other embodiments may perform the process steps in different orders. In addition, other embodiments may include different and/or additional steps than the ones described herein. Other embodiments may also omit steps described herein.

In the process of FIG. 4, context information is received 400 from one or more user clients 100 operated by a user and one or more other users. The user clients 100 may be communicating and acting as a group (such as in a conference call), or they may be communicating and acting individually or in subsets. The context information includes information about the user and one or more other users in communication with the user. In addition, context information may be received from one or more data providers 108.

Structured data is then generated 405 from the context information and a context graph is generated 410 for the user from the structured data. The context graph comprises a plurality of concept nodes, where each concept node represents a concept. A concept node contains concept data related to a concept in the current context (e.g. time when the concept was last mentioned in a conversation, concept type, person that mentioned the concept, etc.). The concept nodes have weighted connections to other concept nodes, which indicate the relationships between the concept nodes. These connections are derived from the information in the ontology graph 315.

A concept score is then generated 415 for each concept node in the context graph, and a plurality of content candidates are selected 420, based on the plurality of concept nodes. A content score is then generated 425 for each content candidate based at least in part on the context graph and the concept scores of the content nodes. This score is a measure of the relevance of the content candidates to the current context. At any time in the process the system may deduplicate the content candidates to remove duplicate content candidates.

The content candidates are then ranked 430 based on their content scores and a context-relevant result set is selected 435 from the ranked content candidates. The system 102 may ensure that there is a sufficient diversity in the types of content candidates in the result set by selectively favoring under-represented content types. The diversification process ensures that there is a variety of content types in the results set to prevent monotonous results from being sent to users. The result set is sent 440 to at least one of the one or more user clients 100, where they may be displayed to the users through the server interaction module 106.

Figure 5A:
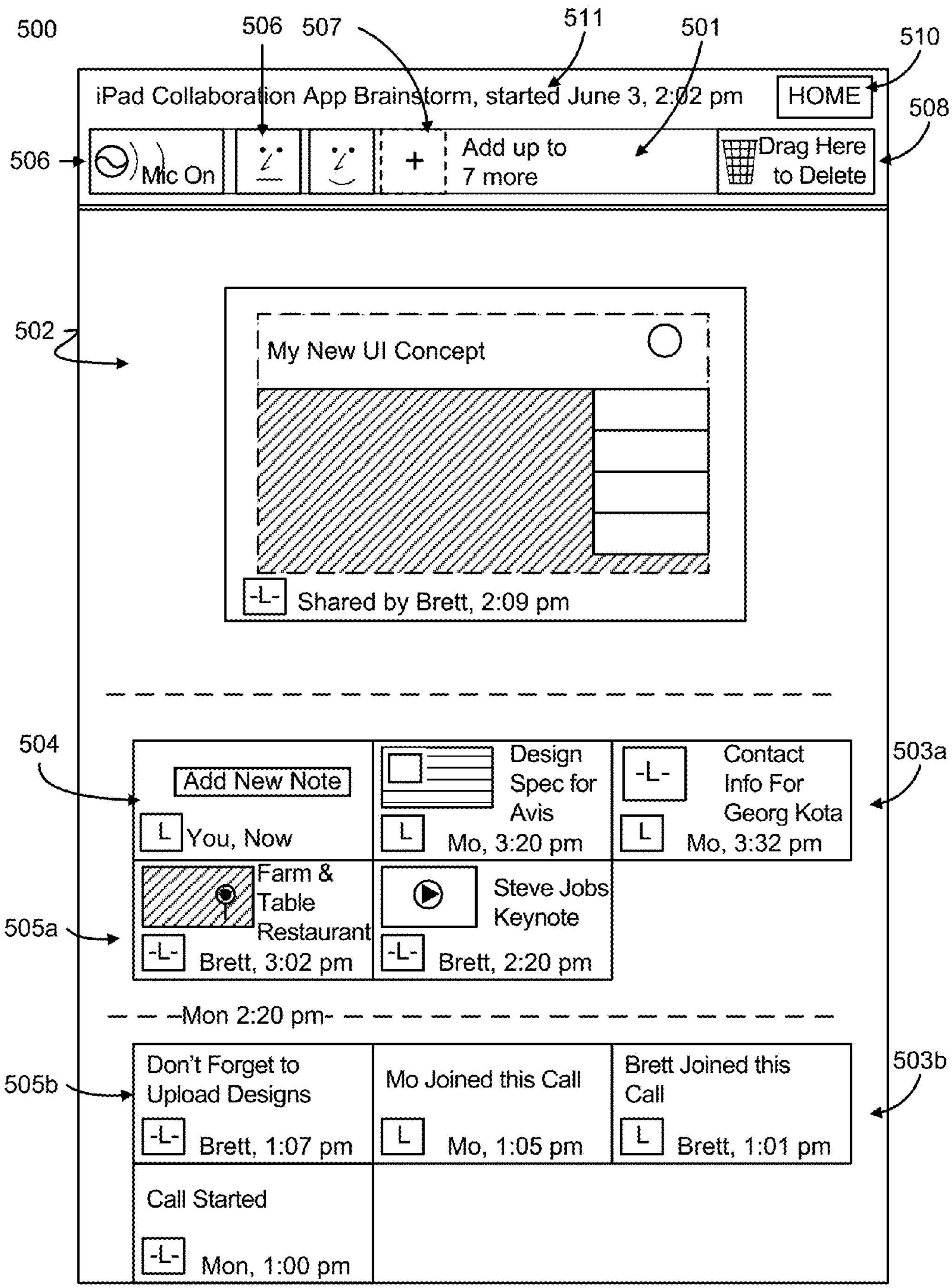
FIGS. 5A and 5B illustrate an embodiment of a collaborative communication application configured to interoperate with an information retrieval system.
Figure 5B:
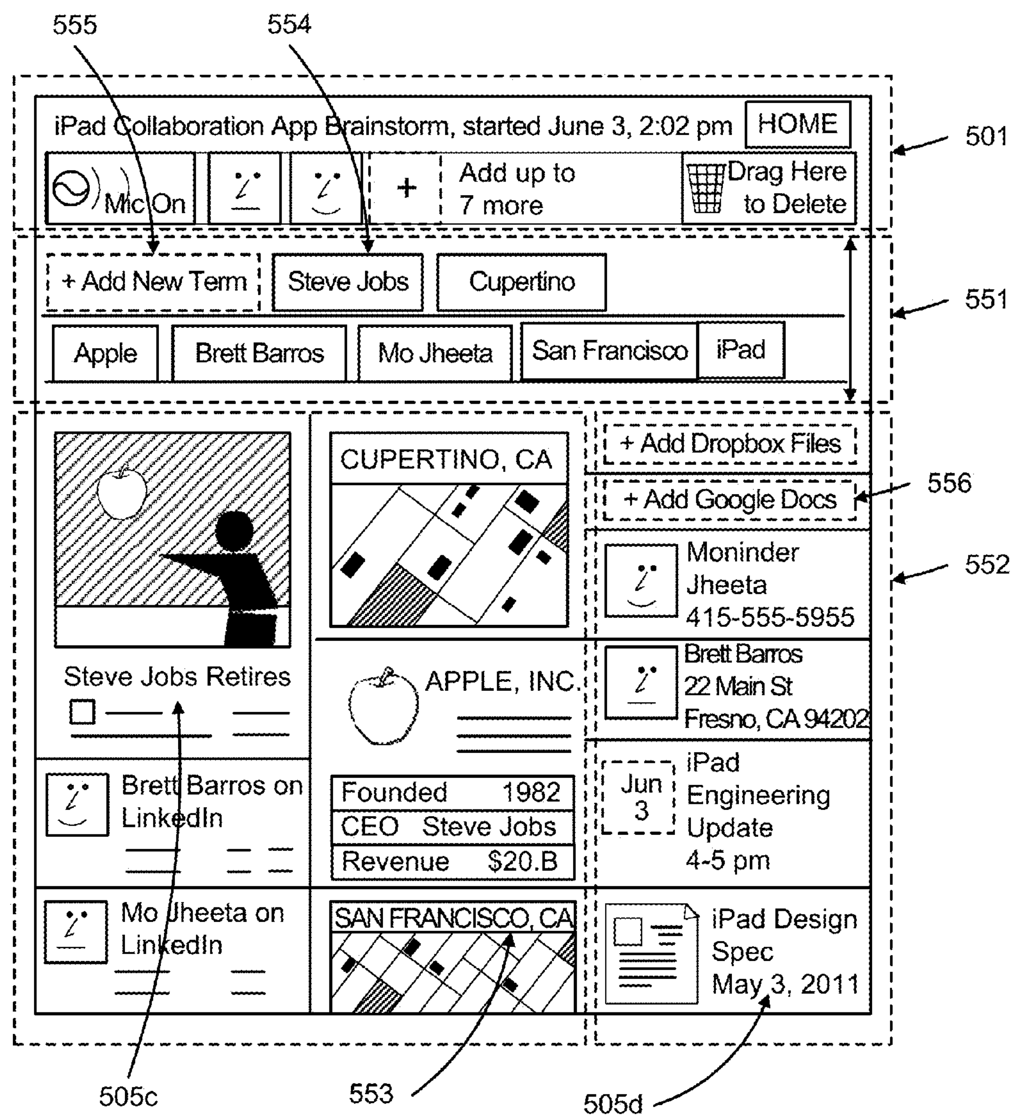

FIGS. 5A and 5B illustrate embodiments of interfaces of a collaborative communication application. This application may serve as the server interaction module 106 describe previously. The collaborative communication application may thus send information to and receive information from the information retrieval system 102. The collaborative communication application executes on the user client 100 and in one embodiment it is a mobile application, such as an application running on a smart phone, tablet computer, or PC. In another embodiment it is a web application running within a web browser. The collaborative communication application allows users to communicate with each other through voice, video, images, and/or text.

By using the collaborative communication application, multiple users can communicate with each other simultaneously, using multiple modes of communication. The multiple modes of communication facilitate collaboration by facilitating the sharing of text, video, and image information alongside real-time voice, video, and text communication between users. When two or more users are in communication with each other using the collaborative communication application they—and their associated user clients 100—are considered to be participants in a "collaborative session". During a collaborative session the collaborative communication application also communicates with the information retrieval system 102 to request and receive real-time information that is relevant to the session. The collaborative communication application may display the received information to a user during a collaborative session and may facilitate the sharing of this information among users in the session.

The context processing module 105 of the information retrieval system 102 may establish a single context that applies for each user participating in a collaborative session. The context for a collaborative session with multiple participating users may be represented by a single context graph in the context graph store 316. The context graph may be generated by processing information received from the user clients 100 participating in the collaborative session. The context graph for a collaborative session may be used to determine content that is relevant to that collaborative session.

The collaborative communication application may comprise one or more user interface modes, where each interface mode comprises a plurality user interface components such as tabs, sliders, buttons, windows, icons, charms, etc. The user interface modes provide users with access to various functions and capabilities of the collaborative communication application. For example, the collaborative communication application may include user interface modes such as: a home screen mode configured to enable users to initiate and join collaborative sessions and to change application settings; a sharing mode configured to enable users to share content with other users in a collaborative session; and a discovery mode configured to enable users to discover new content that is relevant to a collaborative session. In the illustrated embodiment two of the user interface modes are presented: FIG. 5A illustrates an embodiment of a sharing mode 500; and FIG. 5B illustrates an embodiment of a discovery mode 550.

The sharing mode 500 illustrated in FIG. 5A allows a user operating a user client 100 to share content with, and to view content shared by, other users in a collaborative session. The sharing mode 500 includes several user interface components. In the illustrated embodiment the sharing mode 500 includes a control bar 501, a stage window 502, and one or more archive windows 503 (such as archive window 503*a* and 503*b*, hereinafter "archive windows 503" collectively and "archive window 503" individually).

The control bar 501 is a user interface component that gives users access to controls that allow them to administer their collaborative session. For example, the control bar 501 may include a device control that allows users to perform device control functions such as: muting or un-muting the microphone of the user client 100; increasing or decreasing the volume of the user client 100; and activating or deactivating the camera of the user client 100. The control bar 501 may also include one or more participant icons 506. The participant icons 506 are a graphical representation of one or more other users currently participating in a collaborative session with the user. The participant icons 506 enable a user to perform functions related to participants in a collaborative session such as: muting or un-muting a specific participant; removing a participant from a collaborative session; and sending a private message to a participant. The add participant icon 507 allows a user to add a new participant to a collaborative session. When a new participant is added to a collaborative session, the information retrieval system 102 may be notified, and the context processing module 105 may then receive and process information from the user client 100 of the new participant; this information may be used to update the context graph for the collaborative session. The navigation control 510 enables users to switch between the user interface modes. The delete control 508 enables users to remove content from the stage window 502 and the archive windows 503.

The title bar 511 allows a user to add a title for the current collaborative session. This title may be sent to the information retrieval system 102 from where it may be shared with other participants. The context processing module 105 may use the information in the title to determine concepts relevant to the session that may be added to the context graph. For example, if a user titles a collaborative session as "Conversation about cars," the context processing module 105 may use concept extraction with the title text, as described earlier, to determine that cars are a relevant concept for the current collaborative session. A concept node for cars may then be added to the context graph for the collaborative session.

The stage window 502 presents content that is currently being shared with participants in the collaborative session. Content from the discovery mode 550 and from the archive windows 503 may be shared through the stage window 502. Content may be placed by a user into the stage window 502 by dragging it from other user interface components, or by using other user interface controls, for example, by activating a share button on a piece of content. When content is placed in the stage window 502 by a user, the user client 100 will send information to the information retrieval system 102 indicating that the content has been shared with other participants in the collaborative session. This information may be used by the context processing module 105 to modify the current context for the collaborative session. For example, concept nodes in the context graph that are associated with concepts that are related to the shared content may have their concept scores increased to reflect their increased relevance to the current session. The information retrieval system 102 may also notify the other user clients 100 in the collaborative session of the shared content, so that the same content can be displayed in the stage windows 502 displayed to the other session participants.

The archive windows 503 contain a record of the information exchanged in a collaborative session. This information may include: content shared between participants; communication between participants; and content created by participants, such as notes (whether shared or not shared). There may be several archive windows 503, each containing different archived content. In one embodiment the archive windows 503 each contain content archived from a different time period. In another embodiment the archive windows 503 each contain content from a different participant in the session.

Each archived window 503 may include a plurality of content cards 505 (such as content card 505*a*, 505*b*, 505*c*, and 505*d*, hereinafter "content cards 505" collectively and "content card 505" individually). Each content card 505 represents a piece of content and includes a summary of that content. For example, a content card 505 may represent a photo and may include a thumbnail of that photo; a content card may represent a video and may include a thumbnail showing a frame from that video; or the content card 505 may represent a URL and may include a short excerpt of text from that URL. The content cards 505 may be of variable size, based on the type or relevance of the content that they represent. For example, image and video content or highly relevant content may be represented with a larger sized card, while text content or less relevant content may be represented with a smaller sized card.

A user may activate a content card 505, for example using a touch gesture or mouse click. Activating a content card 505 gives users access to the content represented by the content card 505. For example if the content card 505 represents a video, the video will play; if the content card 505 represents a URL, a browser may be launched to load the URL, etc. The content card 505 may also be dragged or otherwise activated to share or re-share the associated content in the stage window 502.

The note button 504 allows users to add a note or other content to the current collaborative session. These notes and other content are archived, and may also be shared through the stage window 502. When a content card 505 is activated or when a note or other content is added to the collaborative session through the note button 504, information about these activities may be sent to the information retrieval system 102. The context processing module 105 may use this information to modify the context graph for the collaborative session's context to reflect the increased relevance of topics that are viewed or mentioned in notes. For example, when a content card 505 is activated, information about concepts associated with the content represented by that content card 505 may be sent to the information retrieval system 102. The context processing module 105 may add these concepts to the context graph as new concept nodes, or if existing concept nodes representing the concepts are already present in the context graph, these existing nodes may have their concept scores increased to reflect the increased relevance of the activated content card 505.

The discovery mode 550 illustrated in FIG. 5B allows a user operating a user client 100 to discover new content that is relevant to the current collaborative session. The discovery mode 550 includes several user interface components. In the illustrated embodiment the discovery mode 550 includes a control bar 501 as described earlier, a concept bar 551 that displays currently relevant concepts, a private content window 552 which displays private content that is relevant to the session, and a public content window 553 which displays relevant public content.

The concept bar 551 comprises one or more concept tabs 554 and an add term button 555. The concept tabs 554 present users with the concepts that are currently relevant to the collaborative session. These concepts may be received by the collaborative communication application from the information retrieval system 102, and may be based on information in the context graph for the current collaborative session. For example, the information retrieval system 102 may select concepts in the context graph to send to the collaborative communication application based on their concept scores. The concept tabs 554 may have visual indicators to indicate the source for a concept. For example, the concept tabs 554 may include an icon, color, or other indicator to show which participant's content or communication provided the concept. In another example, the concept tabs 554 may include an icon, color, or other indicator to show the type of input that was used to discover the concept—e.g. whether the concept was derived from spoken communication, from text input, or from inference by the information retrieval system 102. In one embodiment a user may activate a concept tab 554 to highlight content in the private content window 552 and public content window 553 that is relevant to that concept. In another embodiment a user may activate one or more concept tabs 554 to filter the content displayed in the private content window 552 and the public content window 553—for instance a user may select one or more concept tabs 554 using a touch gesture or mouse click to remove all content in these windows, except the content that is relevant to the selected concepts.

The add term button 555 allows a user to explicitly add terms to the current context for the collaborative session. When a user adds a term to the current context a new concept tab 554 may be added to the concept bar 551. For example, a user may activate the add term button 555 and type the text "San Francisco." Doing so will add a new concept tab 554 with the concept "San Francisco" to the concept bar 551. The information for the new term may be sent from the user client 100 to the information retrieval system 102. The context processing module 105 may then add one or more concepts based on the information in the term to the context graph for the collaborative session. Similarly, in one embodiment, a user may activate an existing concept tab 554 in order to remove the associated terms from the current context. Information about the removed terms may be sent from the user client 100 to the information retrieval system 102. The context processing module 105 may then modify the context graph for the collaborative session by adjusting the scores for, or removing, concept nodes associated with the removed terms, to reflect their reduced relevance to the current collaborative session.

The private content window 552 presents users with a list of relevant content that has been provided by the information retrieval system 102. The content presented in the private content window 552 is content from a user's private documents and personal accounts (such as personal social networking accounts and email accounts) that is relevant to the current collaborative session. The information retrieval system 102 selects this content based on the context graph for the current collaborative session using methods as described earlier. The content may be presented within the private content window 552 using content cards 505 as described earlier. The content cards 505 in the private content window 552 may be made visually distinct to indicate the sources of content. For example content from social networks may be highlighted in one color, while content from a user's local storage may be highlighted in a different color. The private content window 552 may also include one or more account management controls 556. The account management controls 556 allow users to provide access to additional private accounts by providing access credentials for those accounts. These access credentials may be sent to the information retrieval system 102 so that the content from these accounts can also be included in the content presented through the private content window 552.

The public content window 553 is similar to the private content window 552, except that it includes content that is from public sources such as the Internet, shared public directories, etc. The content in the public content window 553 may also be presented through content cards 505, and similar to in the case of the private content window 552, the content cards 505 may be made visually distinct to indicate the sources of the content.

Figure 6A:
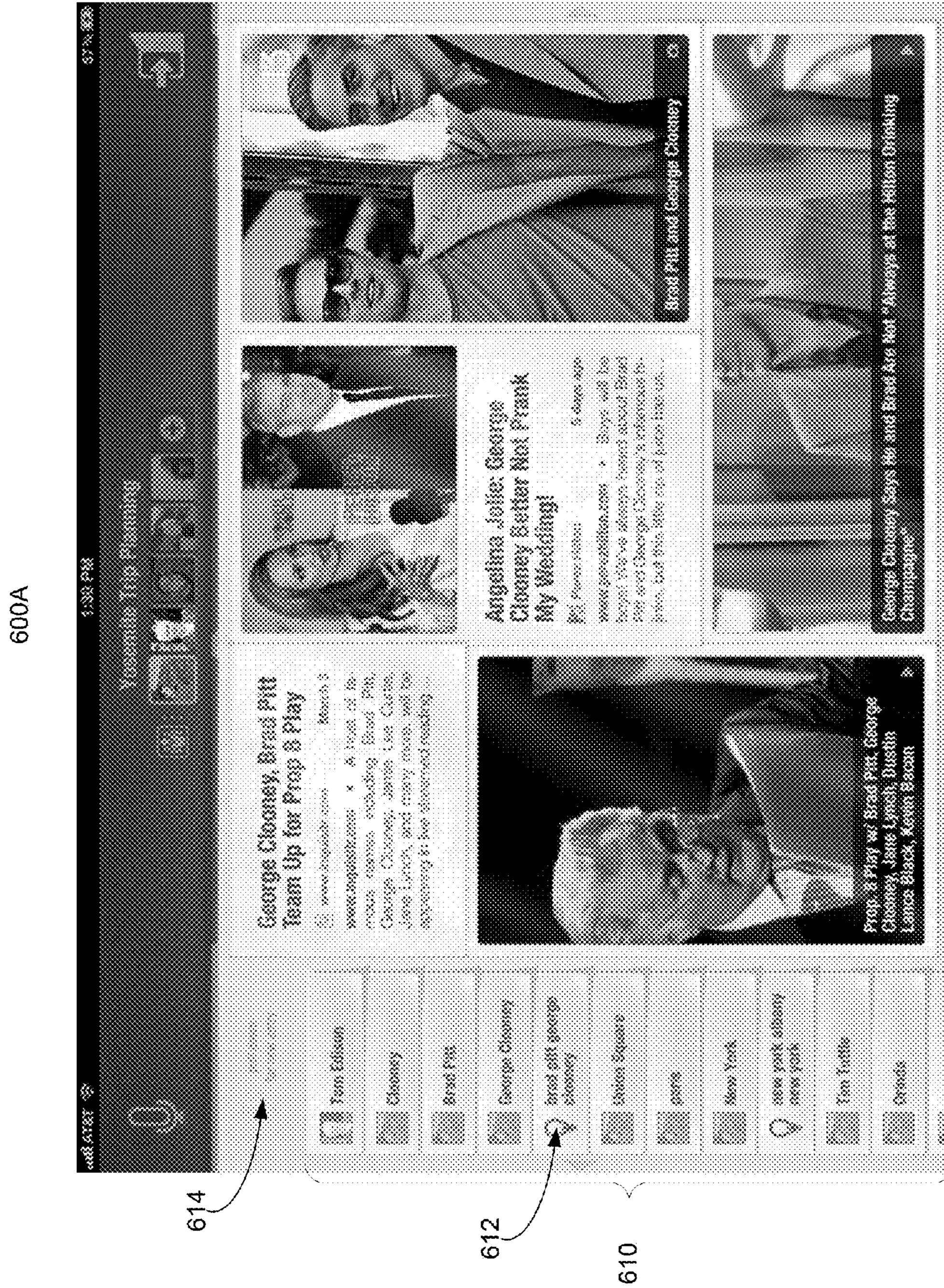
Figure 6C:
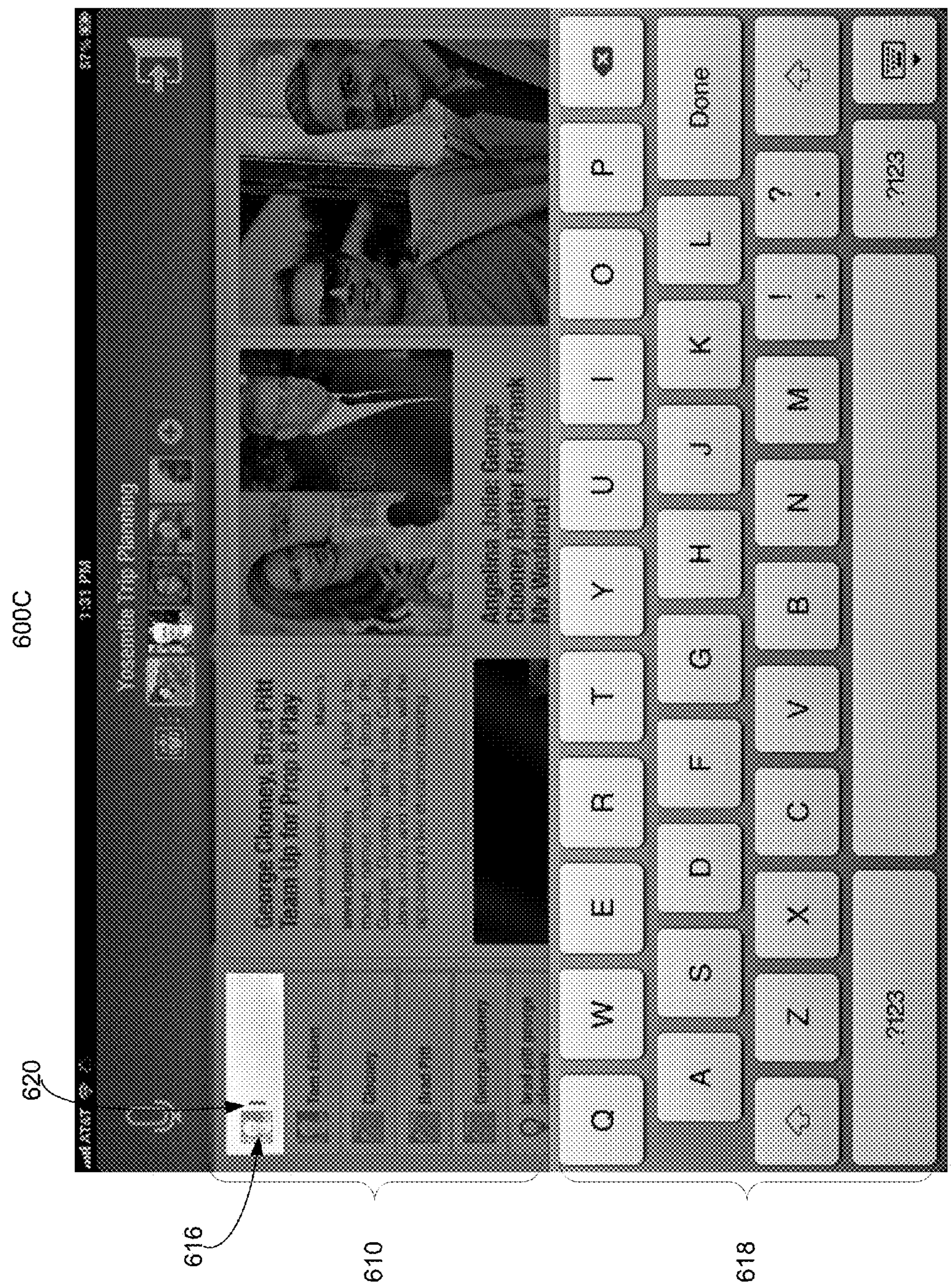

FIGS. 6A, 6B, and 6C illustrate additional embodiments of interfaces of the collaborative communication application. In one embodiment, the user interfaces of FIGS. 6A, 6B, and 6C are used in a variation of the discovery mode 550 shown in FIG. 5B. The user interfaces of FIG. 6 show a vertical concept bar 610 including a set of vertically-stacked concept tabs 554, such as tab 612. A user may select a concept tab 554 in order to highlight or obtain content relevant to the concept shown in the tab. For example, the user may select concept tab 612 to view content relevant to "brad pitt george clooney."

FIG. 6A specifically shows an embodiment of an interface 600A in which the vertical concept bar 610 is displayed at the left side of the interface. At the top of the vertical concept bar 610 is an "add new" user interface element 614 that the user may activate to add a new concept tab. In one embodiment, the add new element 614 is initially hidden behind the vertical concept bar 610 by the interface 600A. The user uses a touch gesture to move the vertical concept bar 610 and reveal the add new element 614. For example, the user may use a finger to "pull" down on the concept bar 610, thereby sliding the vertically-stacked concept tabs 554 downward and gradually revealing the add new element 614. FIG. 6A shows the interface 600A when the concept bar 610 has been pulled down to reveal the help message "pull down for new entry." This message explains usage of the add new element 614 to the user.

FIG. 6B shows an embodiment of the interface 600B in which a new concept tab 616 is added at the top of the vertical concept bar 610 in response to the user moving the concept bar. In the illustrated embodiment, if the user moves the vertical concept bar 610 by a threshold amount, the help message disappears from the interface and is replaced with the new concept tab 616. In one embodiment, the interface 600B animates the addition of the new concept tab 616 so that the tab emerges from the top of the vertical concept bar 610 and slides down into the position formerly occupied by the previous top concept tab. When the user releases the vertical concept bar 610, the new concept tab 616 is positioned as the first concept tab in the set. As shown in the interface 600B of FIG. 6B, the new concept tab is initially blank (not associated with a concept) in one embodiment.

FIG. 6C shows an embodiment of the interface 600C in which the user may enter information into the new concept tab 616. In this interface 600C, a keyboard 618 is displayed to allow the user to provide a concept for the new concept tab 616. A cursor 620 within the new concept tab 616 indicates where the text entered with the keyboard will appear. Once the user finishes entering text, the new concept tab 616 is complete and can be manipulated like the other concept tabs 554 in the vertical concept bar 610. In one embodiment, the interface 600C displays the keyboard 618 and cursor 620 automatically when the user releases the vertical concept bar 610. Thus, the user may immediately provide the concept for the new concept tab 616. The collaborative communication application may then perform actions based on the provided concept, such as automatically searching for information related to the concept.

In one embodiment, the new concept tab 612 automatically disappears if the user does not supply a concept for it. The interface 600C may animate the disappearance. For example, the new concept tab 612 may fade or move up and disappear from the top of the interface 600C. The remaining concept tabs 554 may then animate back to their original positions before the new concept tab 612 was added.

The interfaces of the collaborative communication application described above and illustrated in FIGS. 6A, 6B, and 6C may be used in a variety of situations. The interfaces are not limited to adding concept tabs to a vertical concept bar, but rather can be used to add an item to any type of item list for any application. Moreover, the orientation of the list, and the gestures for adding items to the list can vary. For example, a horizontal gesture may be used to add an item to a horizontally-displayed list of items. Likewise, a horizontal gesture may be used to add an item to a vertically-displayed list of items. Sounds and animations beyond those described above can be also presented by the interfaces in order to improve the user experience.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for a gesture-based search interface. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A method for enabling gesture-based search, comprising:

providing, at a client device during a conversation with a plurality of conversation participants in which a user of the client device is currently participating in real-time, a search interface comprising a concept interface, a content interface adjacent to the concept interface, and a participant interface adjacent to the concept interface and content interface and identifying each of the plurality of conversation participants, the concept interface comprising a plurality of selectable concept tabs displayed in a line within the concept interface and the content interface configured to present content associated with a selected content tab, each selectable concept tab representative of a topic of the conversation identified based on a portion of speech of the conversation and including a visual indicator identifying a conversation participant that spoke the portion of conversation speech based on which the topic of the conversation is identified, wherein the client device comprises a touchscreen display;

receiving, at the concept interface, a gesture input associated with adding an additional concept tab, wherein the gesture input comprises a touch input on the touchscreen display dragged in a direction towards the line of concept tabs;

presenting, in response to receiving the gesture input, a concept input mechanism configured to allow a user of the client device to enter a concept for the additional concept tab; and in response to receiving a concept for the additional concept tab via the concept input mechanism, displaying the additional concept tab within the concept interface;

wherein the content interface displays content associated with the received concept in response to the additional concept tab being selected.

2. The method of claim 1, wherein the selectable concept tabs are identified automatically based on concepts determined to be most relevant to the conversation.

3. The method of claim 1, wherein the concept input mechanism is presented in response to the touch input being dragged in a direction towards the line of concept tabs by a threshold distance.

4. The method of claim 1, wherein the concept input mechanism is presented in response to the user releasing the touch input.

5. The method of claim 1, wherein the content interface is configured to display, in response to a selection of a plurality of selectable concept tabs, content items each associated with every selected concept tab.

6. The method of claim 1, wherein the visual indicator identifying a conversation participant comprises an icon corresponding to the conversation participant.

7. The method of claim 1, wherein the visual indicator identifying a conversation participant comprises a color corresponding to the conversation participant.

8. The method of claim 1, further comprising:

receiving, at the concept interface, a gesture input associated with removing a concept tab;

wherein the content interface is updated to remove at least some displayed content associated with the removed concept tab.

9. A non-transitory computer-readable storage medium storing executable computer program instructions for enabling gesture-based search, the instructions performing steps comprising:

providing, at a client device during a conversation with a plurality of conversation participants in which a user of the client device is currently participating in real-time, a search interface comprising a concept interface, a content interface adjacent to the concept interface, and a participant interface adjacent to the concept interface and content interface and identifying each of the plurality of conversation participants, the concept interface comprising a plurality of selectable concept tabs displayed in a line within the concept interface and the content interface configured to present content associated with a selected content tab, each selectable concept tab representative of a topic of the conversation identified based on a portion of speech of the conversation and including a visual indicator identifying a conversation participant that spoke the portion of conversation speech based on which the topic of the conversation is identified, wherein the client device comprises a touch-screen display;

receiving, at the concept interface, a gesture input associated with adding an additional concept tab, wherein the gesture input comprises a touch input on the touch-screen display dragged in a direction towards the line of concept tabs;

presenting, in response to receiving the gesture input, a concept input mechanism configured to allow a user of the client device to enter a concept for the additional concept tab; and in response to receiving a concept for the additional concept tab via the concept input mechanism, displaying the additional concept tab within the concept interface;

wherein the content interface displays content associated with the received concept in response to the additional concept tab being selected.

10. The computer-readable storage medium of claim 9, wherein the selectable concept tabs are identified automatically based on concepts determined to be most relevant to the conversation.

11. The computer-readable storage medium of claim 9, wherein the concept input mechanism is presented in response to the touch input being dragged in a direction towards the line of concept tabs by a threshold distance.

12. A computer system for enabling gesture-based search, comprising:

a non-transitory computer readable storage medium storing executable computer program instructions comprising instructions for:

providing, at the computer system during a conversation with a plurality of conversation participants in which a user of the computer system is currently participating in real-time, a search interface comprising a concept interface, a content interface adjacent to the concept interface, and a participant interface adjacent to the concept interface and content interface and identifying each of the plurality of conversation participants, the concept interface comprising a plurality of selectable concept tabs displayed in a line within the concept interface and the content interface configured to present content associated with a selected content tab, each selectable concept tab representative of a topic of the conversation identified based on a portion of speech of the conversation and including a visual indicator identifying a conversation participant that spoke the portion of conversation speech based on which the topic of the conversation is identified, wherein the computer system comprises a touch-screen display;

receiving, at the concept interface, a gesture input associated with adding an additional concept tab, wherein the gesture input comprises a touch input on the touch-screen display dragged in a direction towards the line of concept tabs;

presenting, in response to receiving the gesture input, a concept input mechanism configured to allow a user of the computer system to enter a concept for the additional concept tab; and in response to receiving a concept for the additional concept tab via the concept input mechanism, displaying the additional concept tab within the concept interface;

wherein the content interface displays content associated with the received concept in response to the additional concept tab being selected; and a processor for executing the computer program instructions.

13. The computer system of claim 12, wherein the selectable concept tabs are identified automatically based on concepts determined to be most relevant to the conversation.

14. The computer system of claim 12, wherein the concept input mechanism is presented in response to the touch input being dragged in a direction towards the line of concept tabs by a threshold distance.

15. The computer system of claim 12, wherein the concept input mechanism is presented in response to the user releasing the touch input.

* * * * *